United States Patent [19]
Stansberry

[11] Patent Number: 4,637,619
[45] Date of Patent: Jan. 20, 1987

[54] CONCENTRIC SEAL RINGS

[75] Inventor: Warren W. Stansberry, Phoenix, Ariz.

[73] Assignee: Sperry Corporation, New York, N.Y.

[21] Appl. No.: 811,065

[22] Filed: Dec. 19, 1985

[51] Int. Cl.⁴ .............................................. F16J 15/12
[52] U.S. Cl. .............................. 277/167.5; 277/188 A; 277/207 R; 277/215
[58] Field of Search ............... 277/1, 105, 198, 207 R, 277/188 A, 215, 167.5

[56] References Cited

U.S. PATENT DOCUMENTS

| | | | |
|---|---|---|---|
| 101,488 | 4/1876 | Mendham | 277/167.5 |
| 279,087 | 6/1883 | Emery | 277/167.5 |
| 508,765 | 11/1893 | Rouse | 277/167.5 X |
| 2,200,546 | 5/1940 | Furman | 277/207 X |
| 2,815,549 | 12/1957 | Olson | 277/167.5 X |
| 4,406,467 | 9/1983 | Burger et al. | 277/167.5 X |
| 4,470,608 | 9/1984 | Warren | 277/207 R X |

*Primary Examiner*—Robert S. Ward
*Attorney, Agent, or Firm*—Howard P. Terry

[57] ABSTRACT

A plurality of concentric sealing rings on the face of a static sealing surface provides a positive seal when used with Teflon film or like materials that have a tendency to cold flow under pressure into recesses created by the concentric sealing rings.

1 Claim, 2 Drawing Figures

CONCENTRIC SEAL RINGS

BACKGROUND OF THE INVENTION

1. Field of the Invention

The present invention relates to sealing a volatile fluid within a chamber where the chamber is composed of two separate pieces.

2. Description of the Prior Art

Prior art sealing methods for a chamber housing two separate halves has typically been accomplished using adhesive materials, gaskets and o-rings. Each of the prior art methods has disadvantages relating to leaks, the integrity of the seal or the seal being attacked and decomposed by the fluid in the chamber. Attempts have also been made to seal two halves of a chamber with a thin film of Teflon or similar material. However, Teflon and similar materials tend to "cold flow" or be squeezed away as the two halves of the chamber are tightened together. The present invention permits sealing two halves of a chamber housing without the use of adhesives, gaskets, etc., and solves the problem of Teflon cold flowing away from the area to be sealed.

SUMMARY OF THE INVENTION

A plurality of concentric sealing rings on the face of a static sealing surface provides a positive seal when used with Teflon film or like materials that have a tendency to cold flow under pressure.

DESCRIPTION OF THE PREFERRED EMBODIMENT

Figure 1:
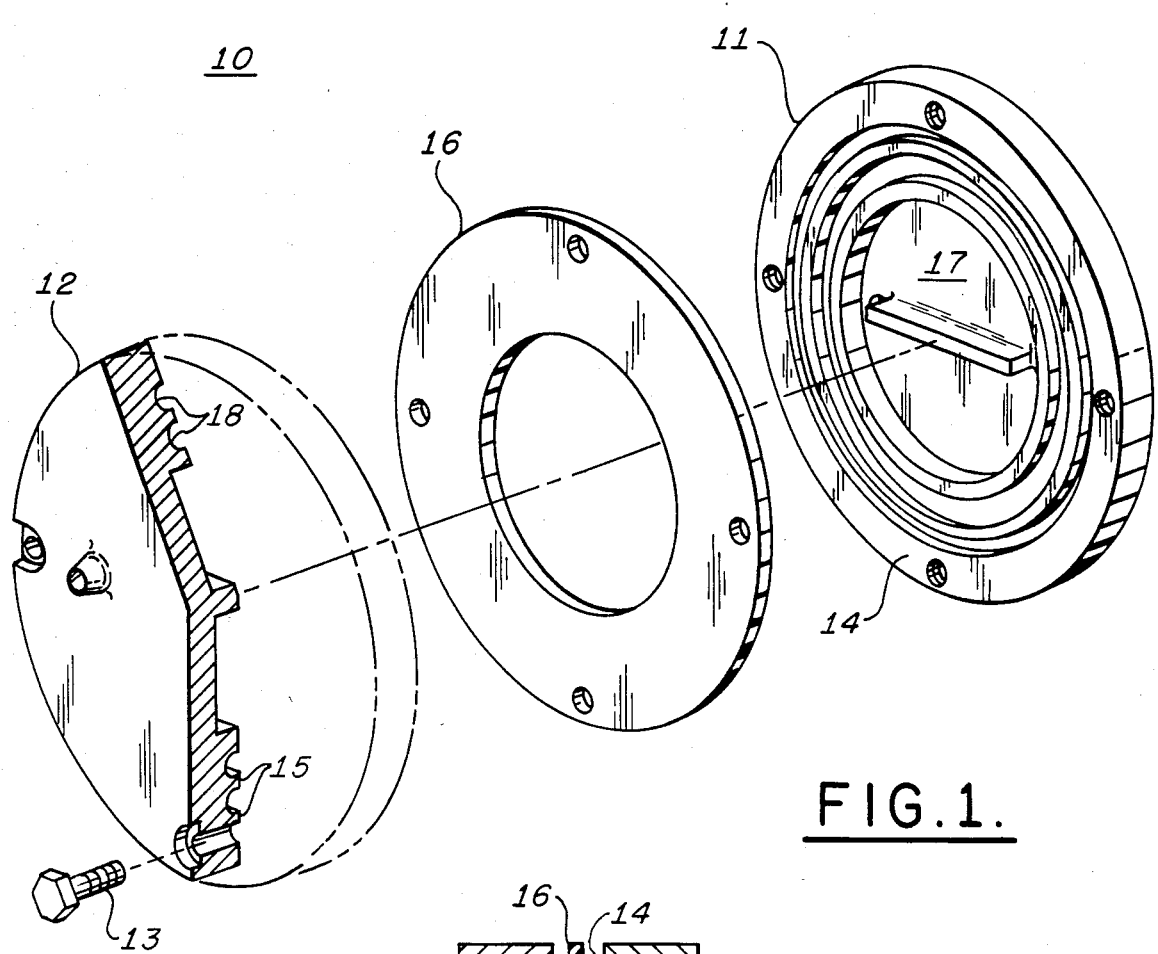
FIG. 1 is a perspective of a fluid chamber showing a Teflon seal and the concentric sealing rings of the present invention.

Referring to FIG. 1, a fluid chamber 10 composed of halves 11 and 12 is fastened together with a plurality of screws 13. Chamber halves 11 and 12 each have a static sealing face 14. At the inner edge of static sealing face 14, there is disposed a plurality of raised concentric rings 15. A gasket material 16, for example Teflon or similar material, that will not be attacked by fluid within chamber 17 is compressed as chamber halves 11 and 12 are fastened together.

Figure 2:
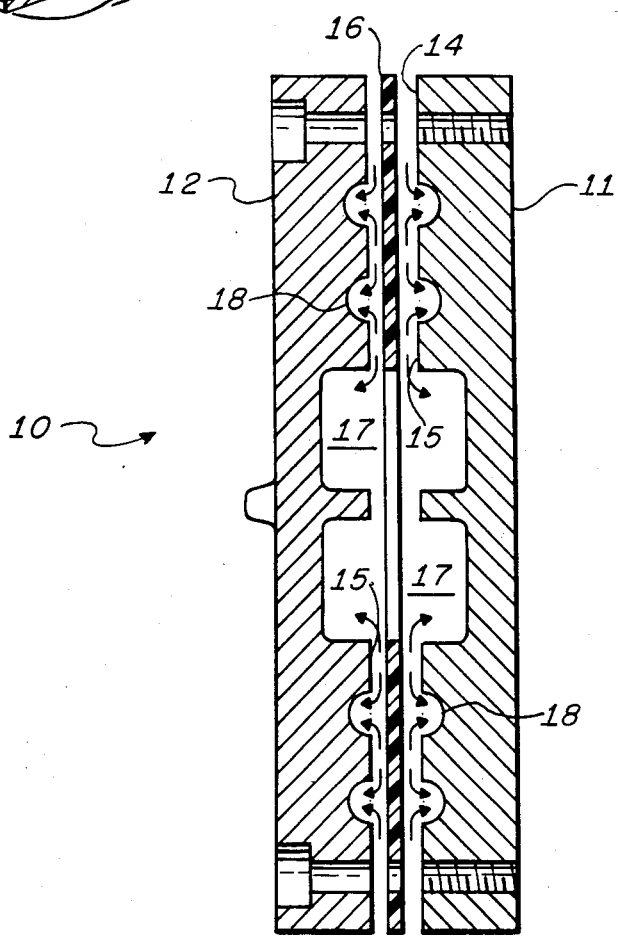
FIG. 2 is an enlargement of area immediately adjacent to the concentric sealing rings.

Referring now to FIG. 2, the effect of the concentric sealing rings 15 will be explained. As the Teflon gasket 16 is compressed between chamber halves 11 and 12, the Teflon is forced in the direction of the arrows into the recesses 18 formed by the concentric sealing rings 15. The present invention makes use of the cold flow property of Teflon or similar material. The Teflon or similar material is trapped in recesses 18. The density of the trapped gasket material is increased and a reliable seal is formed.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. An apparatus providing a seal between two halves of a fluid chamber comprising:
    a fluid housing formed from two halves each having a static sealing face, said housing have an internal cavity when said static sealing faces are held together by a compressive force,
    a plurality of raised concentric rings disposed on each of said static sealing face,
    spaces between said rings forming recesses,
    means for annularly aligning said rings and annularly aligning said recesses on a common axis,
    a planar gasket material extended across and disposed between said sealing faces, said material having a predetermined density when unconstrained, and having the property of deformation with time when subject to compressive forces, and
    means for applying said compressive force to said gasket material so that portions of said material are forced into said recesses, whereby said predetermined density increases within said recesses as said gasket deforms with time.

* * * * *